United States Patent [19]

Strandholm

[11] Patent Number: 5,068,118

[45] Date of Patent: Nov. 26, 1991

[54] METHOD OF MAKING SIMULATED CHEESE CONTAINING CASEIN MATERIALS

[75] Inventor: John J. Strandholm, Morton Grove, Ill.

[73] Assignee: Kraft General Foods, Inc., Glenview, Ill.

[21] Appl. No.: 557,698

[22] Filed: Jul. 25, 1990

[51] Int. Cl.$^5$ ............................................... A23C 20/00
[52] U.S. Cl. ................................. 426/582; 426/330.2; 426/334; 426/604
[58] Field of Search ...................... 426/330.2, 334, 604, 426/582

[56] References Cited

U.S. PATENT DOCUMENTS 2,702,800  2/1955  Hipp ...................................... 530/361
4,444,800  4/1984  Bixby et al. ........................... 426/582
4,968,513  11/1990  Watanabe et al. .................... 426/580

Primary Examiner—Marianne Cintins
Assistant Examiner—Helen Pratt
Attorney, Agent, or Firm—Fitch, Even, Tabin & Flannery

[57] ABSTRACT

The present invention is directed to a simulated cheese product wherein all or a part of the skim milk solids, acid casein, caseinates or rennet casein commonly used in a simulated cheese product is replaced with a casein material selected from the group consisting of alpha-S-1 casein, alpha-S-2 casein, beta casein, kappa casein, gamma casein, dephosphorylated native casein, dephosphorylated alpha-S-1 casein, dephosphorylated alpha-S-2 casein, dephosphorylated beta casein, dephosphorylated kappa casein, dephosphorylated gamma casein and mixtures thereof. The simulated cheese product is made by providing an admixture of the modified casein material with an edible lipid material selected from the group consisting of fat and oil and an emulsifying agent and heating the admixture with agitation to provide the simulated cheese product. Suitable flavoring agents and coloring agents may also be present in the simulated cheese product.

16 Claims, No Drawings

METHOD OF MAKING SIMULATED CHEESE CONTAINING CASEIN MATERIALS

FIELD OF THE INVENTION

The present invention is directed to the control of texture, firmness and meltability of simulated process cheese. More particularly, the present invention is directed to the use of casein fractions and dephosphorylated casein and casein fractions to produce a simulated process cheese which may have physical properties similar to simulated process cheese analogs made with traditional caseinates and rennet casein and wherein the properties of texture, firmness and meltability are controlled.

Imitation cheese products have been produced from a variety of protein sources such as rennet casein, skim milk solids, alkali and alkaline earth caseinates and the like. In many instances the above protein sources have been combined with minor amounts of the cheese being simulated and act as an extender therefor.

Alkali and alkaline earth metal caseinates have been used in the production of process cheese products as shown in U.S. Pat. No. 3,922,374 to Bell et al. Preparation of simulated cheese products from rennet casein is described in U.S. Pat. Nos. 4,197,322 to Middleton, 4,822,623 to Middleton and 4,444,800 to Bixby et al.

Casein is a mixed complex of phosphoproteins which are present in all mammalian milk as colloidally dispersed micelles 50 to 600 nanometers in diameter. The variable-sized micelles are assembled from spherical subunits of nearly uniform diameter (10 to 20 nm), containing 25 to 30 casein molecules. Small amounts of calcium phosphate together with serum ionic calcium plays a significant role in micellar structure. Casein can be separated from the whey proteins of milk by gel-filtration, high-speed centrifugation, salting-out with appropriate concentrations of neutral salts, acid precipitation at pH 4.3–4.6, and coagulation with rennet or other proteolytic enzymes. The first three methods yield preparations in essentially their native micellar state, but are impractical for commercial use. Thus, commercial casein used in the manufacture of simulated cheese is usually made by acid precipitation to produce acid casein or by rennet coagulation to produce rennet casein. Caseinates may be prepared by the slow addition of a suitable alkali to the wet curd of an acid casein. The alkali is added at a level to produce a pH of 6.7–7.0. Protein concentrations of about 20% are spray dried to provide the caseinate. Sodium caseinate is the most commonly used form of caseinate in the food industry, but caseinates containing cations of potassium, ammonium, magnesium and calcium are also produced.

The casein phosphoproteins have been subdivided into a number of classes on the basis of their electrophoretic activity in alkaline-urea medium. These fractions have been designated alpha-S-1 casein, alpha-S-2 casein, beta casein, kappa casein and gamma casein. The amino acid sequences of the various casein fractions have been determined, as described in West, D. W., Journal of Dairy Research (1986) 53, 333-352.

As discussed in the West article, the proteolysis of milk leading to curd formation is the basis of cheese production. In the manufacture of cheese, the firmness of the curd produced following proteolysis of kappa casein by rennet is an important consideration, since cutting the curd at the correct firmness insures that the whey drains properly while minimizing the loss of milk solids. It has been determined that the phosphoprotein residues of casein are important to proper curd formation as indicated by the fact that curd tension was shown to decrease as more of the phosphate groups were removed from the caseins (Yun et al, (1982), Agricultural and Biological Chemistry 46-443-449). A very soft curd was formed when 60% of the total phosphate groups had been removed (Yun et al., (1982), Agricultrual and Biological Chemistry 46-1505-1511).

It has now been determined, however, that casein fractions and dephosphorylated casein and casein fractions can be used in the preparation of a simulated cheese and that the firmness, texture and meltability of the simulated cheese can be controlled through the selection of a particular casein fraction or dephosphorylated casein or casein fraction. The use of dephosphorylated casein fractions in the preparation of simulated cheese is particularly important since the preparation of proteins through recombinant DNA techniques produces a protein which is not phosphorylated. Phosphorylation of proteins is a post-translational event which occurs in the Golgi apparatus in mammals after formation of the protein.

Accordingly, it is a principal object of the present invention to provide a simulated cheese utilizing casein fractions and dephosphorylated casein and casein fractions. It is another object of the present invention to control the firmness, texture and meltability of simulated cheese through the use of casein fractions, dephosphorylated casein and dephosphorylated casein fractions.

SUMMARY OF THE INVENTION

The present invention is directed to a simulated cheese product wherein all or a part of the skim milk solids, acid casein, caseinates or rennet casein commonly used in a simulated cheese product is replaced with a casein material selected from the group consisting of alpha-S-1 casein, alpha-S-2 casein, beta casein, kappa casein, gamma casein, dephosphorylated native casein, dephosphorylated alpha-S-1 casein, dephosphorylated alpha-S-2 casein, dephosphorylated beta casein, dephosphorylated kappa casein, dephosphorylated gamma casein and mixtures thereof. The simulated cheese product is made by providing an admixture of the modified casein material with an edible lipid material selected from the group consisting of fat and oil and an emulsifying agent and heating the admixture with agitation to provide the simulated cheese product. Suitable flavoring agents and coloring agents may also be present in the simulated cheese product.

DETAILED DESCRIPTION OF THE INVENTION

More specifically, a non-cultured simulated cheese product embodying the invention is a smooth, homogeneous plastic mass wherein at least part of the protein source for the simulated cheese analog is a modified casein material selected from the group consisting of dephosphorylated native casein, alpha-S-1-casein, alpha-S-2-casein, beta casein, gamma casein, dephosphorylated alpha-S-1 casein, dephosphorylated alpha-S-2 casein, dephosphorylated beta casein, dephosphorylated gamma casein and mixtures thereof. The modified casein material can be used to replace from about 10% to 100% of the skim milk solid, acid casein, caseinates or rennet casein used in the preparation of prior art simulated cheese products. The total protein in the simulated cheese product will be from about 8% to about 25%. The modified casein material of the invention is used to provide from about 10% to 100% of the total protein. The balance of the protein is preferably provided from a milk protein source selected from the group consisting of skim milk solids, acid casein, caseinates, rennet casein and whey protein. Other protein sources, such as vegetable proteins, animal proteins and fish proteins, may also be used to provide all or a part of the balance of the protein. All percentages used herein are by weight unless specified otherwise. The simulated cheese product will also contain from about 40% to about 60% water and from 0% to about 75% of an edible fat or oil. The edible fat or oil, if used, is preferably present at a level of from about 2% to about 35%. Preferably, an emulsifying agent is used in the simulated cheese product at a level of from about 1% to about 5%.

Casein fractions used in the present invention, i.e., alpha, beta and gamma caseins, can be prepared by the methods set forth in U.S. Pat. No. 2,572,026 to Hipp et al. and U.S. Pat. No. 2,702,800 to Hipp et al. In general, this process for separating whole casein into its components includes the steps of dissolving whole casein in an aqueous urea solution having a urea concentration sufficient to provide the solution, reducing the urea concentration of the solution to about 4.6 molar by addition of water, removing precipitated alpha-casein, reducing the urea concentration of the remaining solution to about 1.7 molar by addition of water, removing precipitated beta-casein and then precipitating gamma casein present in the remaining solution.

The dephosphorylation of native casein or the casein fractions is preferably accomplished through use of alkaline phosphatase, although acid phosphatase can also be used. Dephosphorylation of sodium caseinate can be carried out without dialysis in suitable containers at a temperature of about 35° C. by means of the addition of alkaline phosphatase. The level of enzyme used to obtain maximum dephosphorylation in twenty-four hours is 0.04 units of alkaline phosphatase per mg of sodium caseinate. Partially dephosphorylated sodium caseinate can be obtained by use of lower levels of alkaline phosphatase. Dephosphorylation of the casein fractions is also accomplished through the use of alkaline phosphatase. In general, dephosphorylation of native casein and the casein fractions wherein the total dephosphorylation is from about 20 percent to about 100 percent of the total phosphate units, is suitable for the simulated cheese products of the present invention. A dephosphorylated casein fraction can also be prepared by recombinant DNA techniques utilizing a suitable plasmid vector in a suitable carrier.

Suitable edible lipid materials are well known in the cheese industry and include, but are not limited to, milk fat, coconut oil, palm oil, corn oil, cottonseed oil, soybean oil, safflower oil, olive oil and mixtures thereof.

Suitable emulsifying agents include edible salts such as mono-, di-, and trisodium citrate, mono-and diglycerides, and the alkaline metal phosphates, e.g., disodium phosphate, trisodium phosphate, sodium hexametaphosphate, sodium tripolyphosphate, tetrasodium phosphate, dipotassium phosphate, monosodium diphosphate, disodium diphosphate, tetrasodium diphosphate and the like, disodium aluminum phosphate and mixtures thereof.

It is usually desirable to add a small amount of a flavoring agent to the simulated cheese products of the invention. Flavoring agents, such as starter distillate, natural cheese flavors or artificial cheese flavors are preferred. Alternatively, the components of starter distillate may be added, for example, diacetyl alone or in combination with an acidulent such as lactic acid, citric acid, glucona-delta-lactone, hydrochloric acid or the like.

The modified casein materials of the present invention may be used to provide simulated cheese products with textures that are the same as, harder or softer than conventional simulated cheese products. Meltability can be modified to provide products with the same meltability, with less meltability and with more meltability than prior art simulated cheese products. The texture can be modified to be the same as or more brittle than prior art simulated cheese products. The following Examples further illustrate various features of the invention but are intended to in no way limit the scope of the invention which is defined in the appended claims.

EXAMPLE I

Preparation of Alpha-S-1 Casein 200 grams of sodium caseinate was dissolved in 1650 ml of 8M urea. The pH was adjusted to 4.6 with hydrochloric acid. The volume was adjusted to two liters by slow addition of water with stirring. An additional 851 ml of water was slowly added with stirring to provide a solution which was 4.6M urea to form a precipitate. The precipitate was centrifuged at 6800G for twenty minutes. The pellet obtained was suspended in 1100 ml of 8M urea. The suspension was diluted with 813 ml of water to provide a suspension which was 4.6M urea by slow addition of the water with stirring. A precipitate again formed which was centrifuged at 6800G for twenty minutes. The pellet obtained was suspended in about one liter of 8M urea and the pH was adjusted to 6.6 with sodium hydroxide. This suspension was dialyzed against four liters of water in a cold room for several days, changing the water six times. The suspension was filtered and the precipitate obtained was freeze dried to provide a yield of 58 grams of alph-S1-casein.

Preparation of Beta-Casein 70.4 grams of sodium caseinate was suspended in 990 ml of 8M urea. The solution was adjusted to pH 7.5 with sodium hydroxide. 1410 ml of water was slowly added to provide a 3.3M urea solution. The solution remained clear. The pH was slowly adjusted to 4.6 with 3M HCL with stirring. A precipitate formed which was centrifuged at 6800G for twenty minutes. The supernatant was poured off to a graduated cylinder and the volume was measured. The pH was adjusted to 4.9 with 2M sodium hydroxide. 0.243 g of ammonium sulfate was added per ml of supernatant. The ammonium sulfate was added over a thirty minute period while stirring. The pH was checked and adjusted to 4.9 if necessary to form a precipitate. The precipitate was centrifuged at 6800 g for twenty minutes. The pellets were dissolved in 300 ml of 8M urea and the pH was adjusted to 6.6 with sodium hydroxide. The solution was dialyzed against water in a cold room for several days with several changes of water. The filtered material was then freeze dried to provide a yield of 16 grams.

Preparation of Dephosphorylated Sodium Caseinate and Alpha-S-1-Casein

Dephosphorylation of sodium caseinate and alpha-S1-casein was carried out without dialysis in large flasks at a temperature of 35° C. by means of the addition of alkaline phosphatase. Maximum dephosphorylation was obtained in twenty four hours with 0.04 units of alkaline phosphatase per mg of sodium caseinate and alpha-S1-casein. Dephosphorylation of sodium caseinate resulted in a level of 80 percent dephosphorylation. To obtain 80 percent dephosphorylation of alpha-S1-casein, it was necessary to provide an additional dephosphorylation step utilizing 0.04 units of alkaline phosphatase for a further twenty-four hour period. Intermediate levels of dephosphorylation of sodium caseinate and alpha-S1-casein were obtained by using lower amounts of alkaline phosphatase. After dephosphorylation, the caseinate was freeze dried and ground into a powder.

Preparation of Simulated Process Cheese

Simulated process cheese loaves were made utilizing sodium caseinate, 80 percent dephosphorylated sodium caseinate, alpha-S1-casein, 70 percent dephosphorylated alpha-S1-casein and beta casein utilizing the following formulation:

| Ingredient Level | Amount | Weight Percent |
|---|---|---|
| Casein material | 35.26 | 23.50 |
| Disodium phosphate | 3.90 | 2.59 |
| Starch (Col Flo 67) | 3.76 | 1.51 |
| Sodium chloride | 3.00 | 2.00 |
| Mono- and diglycerides (Atmos 150) | 1.25 | .83 |
| Corn syrup solids (Frodex 24) | 0.49 | .33 |
| Sorbic acid | 0.28 | .19 |
| Oil (Humco Mello-Mix, warmed to liquid) | 30.00 | 20.00 |
| Lactic acid (88% solution) | 1.07 | .71 |
| Calcium chloride monohydrate (50% solution) | 1.25 | .83 |
| Water | 69.76 | 46.51 |
|  | 150.02 g | 100.00 |

The dry ingredients were pre-mixed in one container and the water, lactic acid and calcium chloride were pre-mixed in another container. The liquid oil was first mixed with the dry ingredients and the aqueous ingredients were then stirred into the mixture. The mixture was placed into the small bowl of a Brabender Farinograph, which had been preheated to 92° C. with circulating water. Mixing was continued for 4.5 to 5.0 minutes on the lower speed setting. The temperature of the mixture was approximately 85° C at the end of mixing. The mixture was then poured into a small cardboard box (32×32×110 mm) lined with paper. The boxes were wrapped in plastic wrap and placed in a refrigerator over night before removal of the cheese loaf from the boxes.

The meltability of each simulated process cheese and a sodium caseinate control cheese was measured by making a ¼ inch slice from the loaf of cheese, then taking a 22 mm round plug from the slice with a cork borer. This plug was placed in a 150×20mm glass petri dish and put into a pre-heated 450° F. oven for 5.0 minutes. The area of the melted plug was determined and a melt value was calculated. The melt value equals the melted area divided by the unmelted area. The firmness of each simulated process cheese and a sodium caseinate control cheese was calculated from texture profile analysis performed on an Instron Model 1122 testing instrument. Three plugs from each cheese (measuring 21 mm diameter by 25 mm high) were compressed to 80% deformation at a crosshead speed of 100 mm/min at 45° F. The initial modulus (in $kg/cm^2$) was the average initial slope of the stress vs. strain curve and is a measure of the firmness of the cheese. The results of the melt value and initial modulus determinations are set forth hereinbelow in Table I.

TABLE I

| Protein Ingredient | Initial Modulus (firmness) at 45° F. | Melt Value (450° F. 5.0 min. |
|---|---|---|
| Sodium caseinate | 4.1 | 4.7 |
| 80% - dephosphorylated sodium caseinate | 13.8 | 1.3 |
| Alpha-S-1-casein | 9.0 | 5.3 |
| 70% - dephosphorylated alpha-S-1-casein | 4.4 | 4.9 |
| Beta-casein (75% pure) | 1.2 | 1.7 |

In general, the use of dephosphorylated sodium caseinate resulted in a simulated cheese with greater firmness and restricted meltability. The extent of change in the firmness and meltability is proportional to the percent of dephosphorylation. Native alpha-S-1-casein provided a simulated process cheese with melt properties close to that of sodium caseinate cheese but with somewhat firmer texture. Dephosphorylation of alpha-S-1-casein to the extent of 70% provided a cheese close to that of sodium caseinate cheese both with respect to firmness and meltability. A native beta-casein provided a simulated process cheese which was soft and had restricted melt properties From the foregoing, it is apparent that the use of casein fractions and dephosphorylated native casein and casein fractions can be used to impart controlled characteristics to simulated process cheese in respect to firmness, texture and meltability.

What is claimed is:

1. A method for controlling the texture, firmness and melting properties of a simulated cheese product comprising providing a protein material wherein at least a portion of said protein material is a modified casein material selected from the group consisting of alpha-S-1 casein, alpha-S-2 casein, beta casein, kappa casein, gamma casein, dephosphorylated native casein, dephosphorylated alpha-S-1-casein, dephosphorylated alpha-S-2-casein, dephosphorylated beta casein, dephosphorylated gamma casein, dephosphorylated kappa casein and mixtures thereof, admixing said protein material continuing modified casein material with water and heating said admixture with agitation to provide said simulated cheese.

2. A method in accordance with claim 1 wherein said admixture further comprises an edible lipid material selected from the group consisting of fat and oil.

3. A method in accordance with claim 2 wherein said edible lipid material is present at a level of from about 2% to about 35%.

4. A method in accordance with claim 1 wherein said modified casein material comprises from about 10% to 100% of said protein material.

5. A method in accordance with claim 2 wherein said admixture further comprises an emulsifying agent which is present at a level of from about 1% to about 4%.

6. A method in accordance with claim 1 wherein said modified casein material is alpha-S-1 casein.

7. A method in accordance with claim 1 wherein said modified casein material is alpha-S-2 casein.

8. A method in accordance with claim 1 wherein said modified casein material is beta casein.

9. A method in accordance with claim 1 wherein said modified casein material is kappa casein.

10. A method in accordance with claim 1 wherein said modified casein material is gamma casein.

11. A method in accordance with claim 1 wherein said modified casein material is dephosphorylated native casein.

12. A method in accordance with claim 1 wherein said modified casein material is dephosphorylated alpha-S-1-casein.

13. A method in accordance with claim 1 wherein said modified casein material is dephosphorylated alpha-S-2 casein.

14. A method in accordance with claim 1 wherein said modified casein material is dephosphorylated beta casein.

15. A method in accordance with claim 1 wherein said modified casein material is dephosphorylated kappa casein.

16. A method in accordance with claim 1 wherein said modified casein material is dephosphorylated gamma casein.

* * * * *